US010572642B2

(12) United States Patent
Feng et al.

(10) Patent No.: US 10,572,642 B2
(45) Date of Patent: Feb. 25, 2020

(54) METHOD AND APPARATUS FOR IDENTITY AUTHENTICATION

(71) Applicant: ALIBABA GROUP HOLDING LIMITED, George Town, Grand Cayman (KY)

(72) Inventors: Jiang Feng, Hangzhou (CN); Lei Zhao, Hangzhou (CN); Hong Tang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 51 days.

(21) Appl. No.: 15/581,752

(22) Filed: Apr. 28, 2017

(65) Prior Publication Data

US 2017/0235934 A1    Aug. 17, 2017

Related U.S. Application Data

(63) Continuation of application No. PCT/CN2015/092507, filed on Oct. 22, 2015.

(30) Foreign Application Priority Data

Oct. 28, 2014  (CN) .......................... 2014 1 0589657

(51) Int. Cl.
*G06F 21/32* (2013.01)
*H04L 9/32* (2006.01)
*H04L 29/06* (2006.01)

(52) U.S. Cl.
CPC .............. *G06F 21/32* (2013.01); *H04L 9/32* (2013.01); *H04L 63/0861* (2013.01)

(58) Field of Classification Search
CPC . G06F 21/32; G06F 21/31; H04L 9/32; H04L 9/321; H04L 9/3231; H04L 63/0861
See application file for complete search history.

(56) References Cited

U.S. PATENT DOCUMENTS

2007/0288319 A1* 12/2007 Robinson ............... G06Q 30/02
                                                              705/14.25
2012/0140993 A1    6/2012 Bruso et al.
(Continued)

FOREIGN PATENT DOCUMENTS

CN    101826151 A    9/2010
CN    102385703 A    3/2012
(Continued)

OTHER PUBLICATIONS

Extended European Search Report in European Application No. 15854858.6-1870, pursuant to Rule 62 EPC, the supplementary European search report (Art. 153(7) EPC) and the European Search Opinion, dated Sep. 11, 2017.
(Continued)

*Primary Examiner* — Ayoub Alata
(74) *Attorney, Agent, or Firm* — Finnegan, Henderson, Farabow, Garrett & Dunner, LLP (57) ABSTRACT

Apparatuses and methods are disclosed for identity authentication. An exemplary method may include obtaining biometric information for authentication collected by a terminal, and identity information sent by the terminal. The method may also include obtaining prestored biometric information corresponding to the identity information. The method may further include determining whether the biometric information for authentication matches the prestored biometric information. If yes, the method may include determining that the identity authentication is successful. Otherwise the method may include determining that the identity authentication is not successful.

11 Claims, 3 Drawing Sheets

(56) References Cited

U.S. PATENT DOCUMENTS

| | | | |
|---|---|---|---|
| 2013/0015946 A1 | 1/2013 | Lau et al. | |
| 2014/0072185 A1* | 3/2014 | Dunlap | G06K 9/00288 |
| | | | 382/118 |
| 2015/0007295 A1* | 1/2015 | Hou | H04L 9/3231 |
| | | | 726/7 |

FOREIGN PATENT DOCUMENTS

| | | |
|---|---|---|
| CN | 102646190 A | 8/2012 |
| CN | 103425972 A | 12/2013 |
| CN | 103440482 A | 12/2013 |
| CN | 103634120 A | 3/2014 |
| CN | 103714315 A | 4/2014 |
| CN | 103825744 A | 5/2014 |
| CN | 103971043 A | 8/2014 |
| EP | 2 352 321 A1 | 8/2011 |
| JP | H 10139100 A | 5/1998 |
| JP | 2002015086 A | 1/2002 |
| JP | 2006133930 A | 5/2006 |
| JP | 2012226615 A | 11/2012 |
| JP | 2013101513 A | 5/2013 |
| JP | 2013186614 A | 9/2013 |
| JP | 2014081796 A | 5/2014 |
| WO | WO 2013/139221 A1 | 9/2013 |
| WO | WO 2016/066040 A1 | 5/2016 |

OTHER PUBLICATIONS

Japanese Search Report issued in Japanese Application No. 2017-522483, dated May 27, 2019, 35 pages.
First Chinese Office Action issued in Chinese Application No. 201410589657.6, dated Jan. 26, 2018, 19 pages.
First Chinese Search Report issued in Chinese Application No. 201410589657.6, dated Jan. 17, 2018, 2 pages.
Second Chinese Office Action issued in Chinese Application No. 201410589657.6, dated Oct. 24, 2018, 8 pages.
PCT International Search Report and Written Opinion dated Feb. 1, 2016, issued in corresponding International Application No. PCT/CN2015/092507 (14 pages).
Office Action issued from The Japanese Patent Office in corresponding Japanese Application No. 2017-522483, dated Jun. 20, 2019 (12 pgs.).

* cited by examiner

METHOD AND APPARATUS FOR IDENTITY AUTHENTICATION

CROSS REFERENCE TO RELATED APPLICATION

This application claims priority to International Application No. PCT/CN2015/092507, filed on Oct. 22, 2015, which claims priority to and the benefits of priority to Chinese Application No. CN 201410589657.6, filed Oct. 28, 2014, both of which are incorporated herein by reference in their entireties.

TECHNICAL FIELD

The present application relates to network communications, and more particularly, to an identity authentication method and apparatus.

BACKGROUND

With continuous development of Internet technologies, an increasing number of users choose to operate on web pages and access various services provided by service providers. For example, for access to services provided by a service provider, a user may operate an account on a web page, such as account registration, account login, account activation, and account log out.

To avoid that an account of a legitimate user is intercepted by an illegitimate user in practical applications, a service provider needs to perform identity authentication of a user by a server before providing various services to the user. If the identity authentication of the user is successful, the service provider provides corresponding services to the user. Otherwise, the service provider refuses to provide the user with corresponding services.

In existing technologies, a server performs identity authentication of a user mainly by verifying identity information about the user, such as a personal identity card number.

When a user registers an account, the server may display an authentication page to the user via a terminal. After the server receives identity information input by the user on the authentication page, the service may verify whether the identity information is legitimate through a third party system. If yes, the server determines that the identity authentication is successful. Otherwise, the server determines that the identity authentication is not successful.

However, the above identity authentication method in existing technologies can merely determine whether the identity information is legitimate. It cannot determine whether the user who inputs the identity information is the legitimate holder himself/herself of the identity information. Therefore, the reliability of the identity authentication result obtained by the identity authentication method in existing technologies is low.

SUMMARY

The present disclosure provides a method and apparatus for identity authentication to improve the reliability of user identity authentication.

In one aspect, the present disclosure is directed to a method for identity authentication. The method may include obtaining biometric information for authentication collected by a terminal, and identity information sent by the terminal. The method may also include obtaining prestored biometric information corresponding to the identity information. The method may further include determining whether the biometric information for authentication matches the prestored biometric information. If yes, the method may include determining that the identity authentication is successful. Otherwise, the method may include determining that the identity authentication is not successful.

In another aspect, the present disclosure is directed to an apparatus for identity authentication. The apparatus may include a first obtaining module configured to obtain biometric information for authentication collected by a terminal. The apparatus may also include a second obtaining module configured to obtain identity information sent by the terminal. The apparatus may further include a third obtaining module configured to obtain prestored biometric information corresponding to the identity information. In addition, the apparatus may include an identity authentication module configured to determine whether the biometric information for authentication matches the prestored biometric information. If yes, the apparatus may be configured to determine that the identity authentication is successful. Otherwise, the apparatus may be configured to determine that the identity authentication is not successful.

One of the methods for identity authentication in the present disclosure may include obtaining biometric information for authentication collected by a terminal, and identity information sent by the terminal. The method may also include obtaining prestored biometric information corresponding to the identity information. The method may further include determining whether the biometric information for authentication matches the prestored biometric information. If yes, the method may include determining that identity authentication is successful. Otherwise, the method may include determining that the identity authentication is not successful. Accordingly, the method may improve the reliability of user identity authentication.

BRIEF DESCRIPTION OF THE DRAWINGS

The drawings are intended to help to understand the present disclosure. They are part of the present disclosure. Several embodiments and their descriptions are used to explain the present disclosure. The present disclosure includes but not limited to these embodiments.

DETAILED DESCRIPTION

In existing technologies, a server performs identity authentication of a user by verifying identity information about the user. Based on the verification result of identity information, it is hard to determine whether the user who inputs the identity information is the legitimate holder himself/herself of the identity. In real application scenarios, both biometric information and identity information about a user can prove the legitimate identity of the user. Moreover, correspondence between the biometric information and the identity information about the user is unique. Therefore, the method of the present application may include obtaining biometric information for authentication and identity information provided by a user. The method may also include obtaining prestored biometric information corresponding to the identity information. The method may further include determining whether the biometric information for authentication matches the prestored biometric information. If yes, it may indicate that the user who provides the identity information is the legitimate holder himself/herself of the identity information. Otherwise, it may indicate that the user who provides the identity information is an illegitimate holder of the identity information. Accordingly, the method may effectively improve the reliability of user identity authentication.

To clarify the objectives, technical solutions, and advantages of the present application, the technical solutions are described clearly and completely through specific embodiments and corresponding drawings in the following. The described embodiments are merely part of embodiments of the present application, rather than all embodiments. Based on these embodiments, all other embodiments obtained by a person having ordinary skill in the art without any inventive effort shall fall within the scope of the present application.

The methods for identity authentication in the present application are described in detail as follows.

Figure 1:
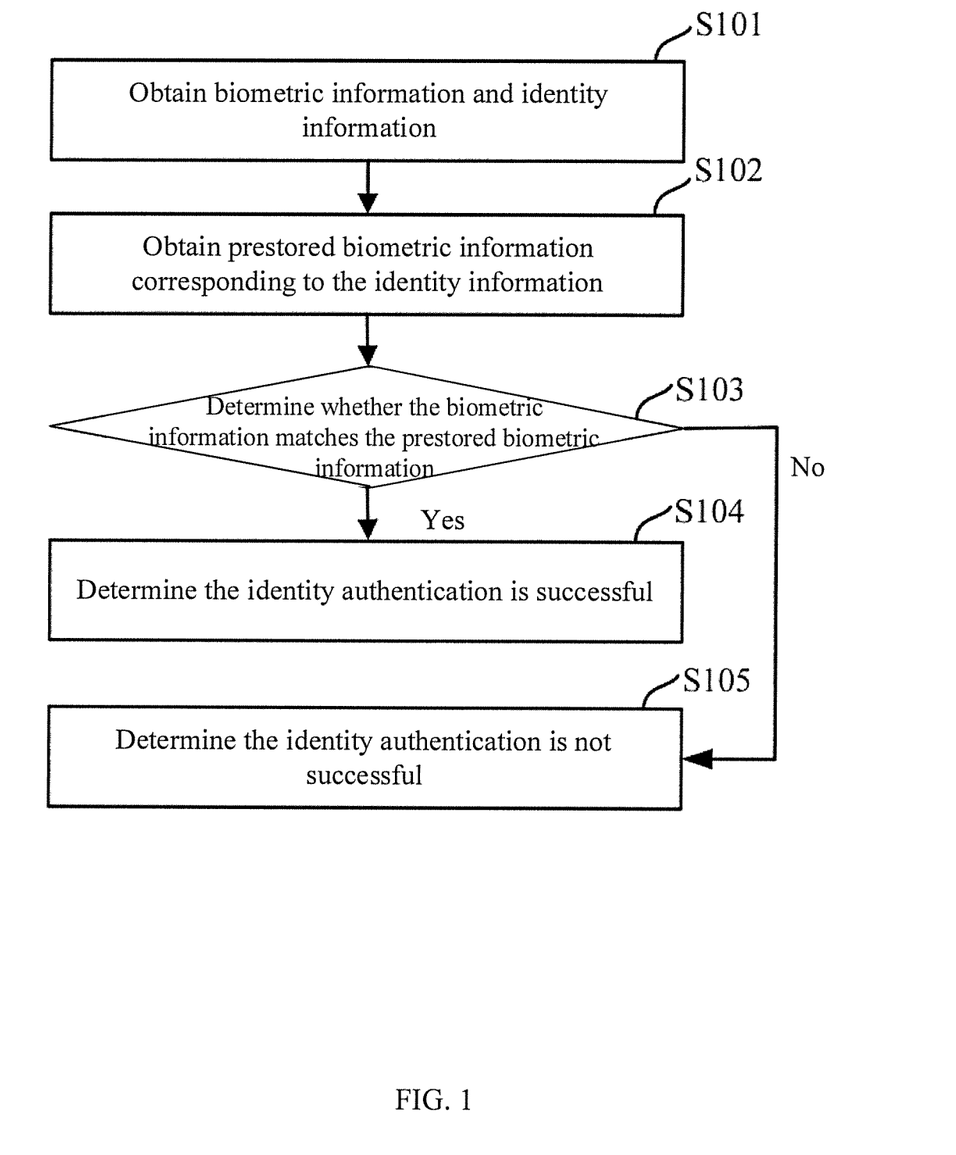
FIG. 1 is a schematic flowchart of an exemplary method for identity authentication, according to an embodiment of the present application.

FIG. 1 is a schematic flowchart of an exemplary method for identity authentication, according to an embodiment of the present application. The method may include the following steps.

S101: Obtain biometric information for authentication collected by a terminal, and identity information sent by the terminal.

The biometric information for authentication in the present application may include physiological feature information about a user, such as facial feature information, fingerprint feature information, and palm print feature information. The biometric information for authentication may also include behavior feature information about the user, such as gait feature information and vocal feature information.

When obtaining biometric information for authentication collected by a terminal, a server may obtain a facial image, fingerprint image, palm print image, gait image, or audio data collected by the terminal. The server may also recognize biometric information for authentication in the facial image, fingerprint image, palm print image, gait image, or audio data. For example, the server may recognize facial feature information, fingerprint feature information, palm print feature information, gait feature information or voice feature information.

The identity information of the present application may include user information on an identity, such as a resident identity card, a passport, an officer identity card, an employee card, a student card, a degree diploma, a degree certificate, a graduation certificate, a bank card, and a membership card.

As for obtaining identity information sent by the terminal, the server may obtain identity information input by the user on a page displayed by the terminal.

In some embodiments, fingerprint feature information and an identity card number may be the biometric information for authentication and the identity information, respectively.

Before the user obtains a service provided by a service provider, the server may display an authentication page to the user through the terminal, and prompt the user to collect fingerprint feature information, i.e. biometric information, of the user via the authentication page. The user may start up a fingerprint collection apparatus of the terminal in accordance with the prompt of the authentication page, and collect a fingerprint image. The terminal may recognize fingerprint feature information in the fingerprint image and send the fingerprint feature information to the server as fingerprint feature information for authentication. The server may then obtain the fingerprint feature information for authentication collected by the terminal.

The server may also prompt the user to input an identity card number, i.e. identity information, via the authentication page. The user may input the identity card number on the page in accordance with the prompt of the authentication page. The terminal may send the identity card number input by the user to the server. The server may then obtain the identity card number sent by the terminal.

S102: Obtain prestored biometric information corresponding to the identity information.

In some embodiments, biometric information corresponding to the identity information of the user may be prestored in a third party system. For example, when a user applies for an identity card, an identity card management system, the third party system, may establish for the user an identity card number uniquely corresponding to the user. For example, an identity card management system of a public security agency may establish for an applicant an identity card number uniquely corresponding to the applicant. At the same time, the identity card management system may collect at least one kind of biometric information, such as fingerprint feature information, uniquely corresponding to the user. The correspondence between the identity card number and the biometric information of the user may be prestored in the identity card management system.

In some embodiments, after obtaining the identity card number, or identity information, of the user by step S101, the server may obtain fingerprint feature information to be the prestored fingerprint feature information by looking up the fingerprint feature information, or biometric information, corresponding to the identity card number in the identity card management system.

In some embodiments, the correspondence between the identity card number and the fingerprint feature information of the user may not be stored in the third party system. For example, the correspondence may be prestored in an information database of the server. The server may look up corresponding fingerprint feature information in accordance with the obtained identity card number.

S103: Determine whether the biometric information for authentication matches the prestored biometric information, and if yes, perform step S104, otherwise perform step S105.

In some embodiments, after obtaining the fingerprint feature information for authentication, or biometric information for authentication, collected by the terminal by step S101, and obtaining the prestored fingerprint feature information, or the prestored biometric information, by step S102, the server may determine whether the fingerprint feature information for authentication matches the prestored fingerprint feature information. In some embodiments, the server may determine whether a similarity degree between the fingerprint feature information for authentication and the prestored fingerprint feature information is greater than a preset threshold. If yes, the server may determine that the fingerprint feature information for authentication matches the prestored fingerprint feature information, and may perform step S104. Otherwise, the server may determine that the obtained and prestored fingerprint feature information are mismatched, and may perform step S105.

S104: Determine that the identity authentication is successful.

When the fingerprint feature information for authentication matches the prestored fingerprint feature information, it may indicate that the user who inputs the identity card number is a legitimate holder of the identity card number. Therefore, the server may determine that the identity authentication of the user is successful.

S105: Determine that the identity authentication is not successful.

When the fingerprint feature information for authentication does not match the prestored fingerprint feature information, it may indicate that the user who inputs the identity card number is an illegitimate holder of the identity card number. Therefore, the server may determine that the identity authentication of the user is not successful.

In the method shown in FIG. 1, the server may obtain the biometric information of the user for authentication sent by the terminal, and may obtain the prestored biometric information corresponding to the identity information provided by the user. Both the biometric information and identity information of the user may be able to verify the legitimate identity of the user. Moreover, the correspondence between the biometric information and the identity information is unique. Therefore, it may be feasible to determine whether the user who provides the identity information is the legitimate holder himself/herself of the identity information in accordance with the determination of whether the biometric information for authentication matches the prestored biometric information. It may effectively improve the reliability of user identity authentication.

In some embodiments, a terminal may obtain identity information by collecting an identity image. The identity information on the identity image may be recognized to obtain the identity information, which may improve the convenience for the user to input identity information, compared to the method whereby a user inputs identity information on a page. Therefore, the terminal may collect an identity image. The identity information in the identity image may be recognized for the server to obtain the identity information collected by the terminal.

In some embodiments, a terminal may collect an identity card image by an image collection apparatus, such as a camera or a scanner. The terminal may recognize the identity card number, and send the recognized identity card number to the server. Accordingly, the server may obtain the identity card number collected by the terminal.

In some embodiments, after collecting an identity card image, the terminal may send the image to the server. The server may recognize the identity card number in the received image to obtain the identity card number.

In some embodiments, the terminal or the server may recognize the text, e.g., Chinese characters and numbers, in the image to obtain the identity card number in the image by an optical character recognition (OCR) technology.

In some embodiments, the server may obtain the palm print image or fingerprint image. A palm print collection instrument or a fingerprint collection instrument may be required on the terminal, which may increase the cost of identity authentication and reduce user convenience thereof. In some embodiments, the server may obtain gait feature information or vocal feature information collected by the terminal as biometric information for authentication. Since the distinction between different pieces of gait feature information or vocal feature information is low, the reliability of user identity authentication is low.

In some embodiments, a terminal may include an image collection apparatus, such as a camera. The terminal may collect a facial image by the camera, and may recognize facial feature information. The server may then obtain facial feature information collected by the terminal.

Figure 2:
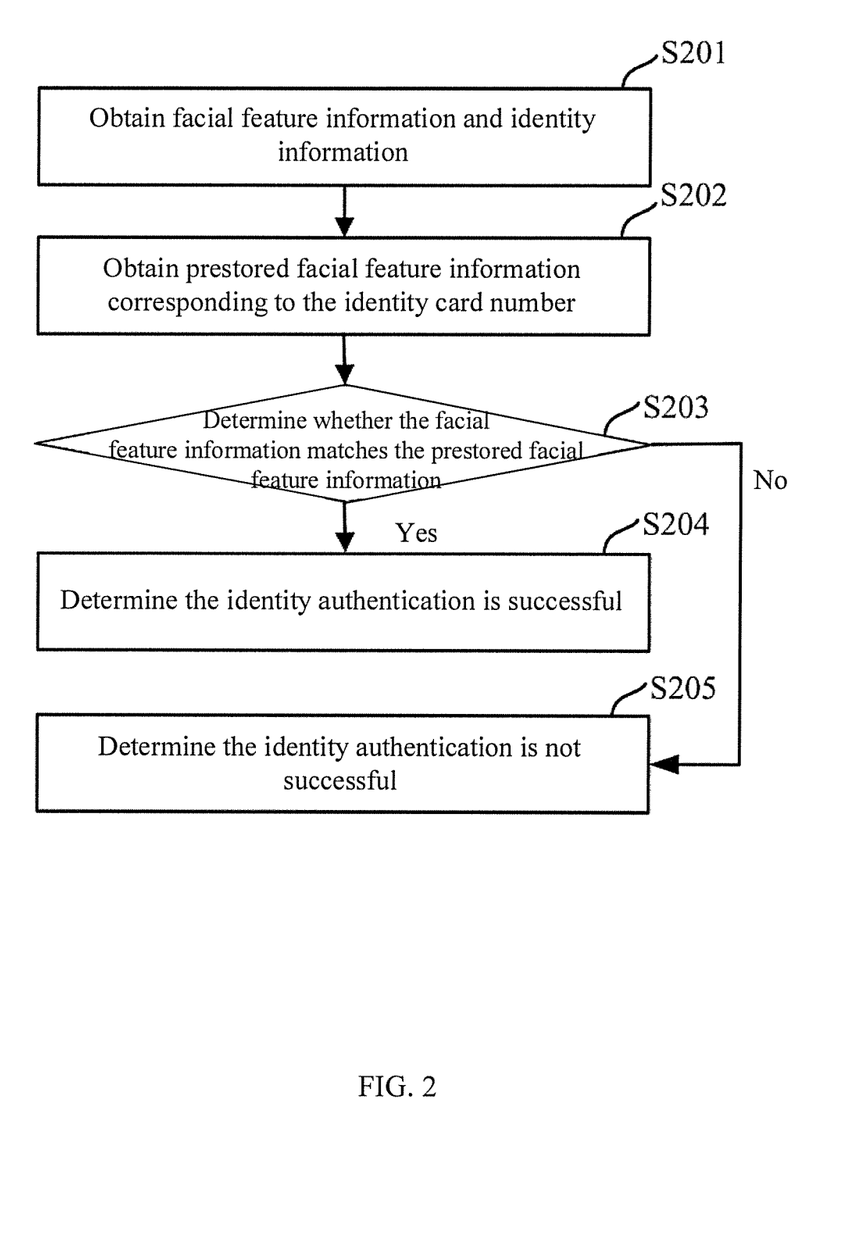
FIG. 2 is a schematic flowchart of another exemplary method for identity authentication, according to an embodiment of the present application.

In some embodiments, the facial feature information for authentication collected by the terminal may be the biometric information for authentication obtained by the server. As shown in FIG. 2, the method for identity authentication is described in detail in the following.

FIG. 2 is an exemplary method for a server to perform user identity authentication in accordance with facial feature information, according to an embodiment of the present application. The method may include the following steps.

S201: Obtain facial feature information for authentication collected by a terminal and identity information sent by the terminal.

For example, the server may obtain a facial image collected by the terminal via a camera, and may recognize the facial feature information in the facial image. The server may take the recognized facial feature information as facial feature information for authentication.

In some embodiments, after obtaining the image collected by the terminal, the server may determine that a face figure exists in the image in accordance with certain preset facial features. The server may recognize facial feature information for authentication, such as the sizes, locations, and distances of the profiles of five sense organs of the face in the determined face figure. Moreover, if the server determines that no face figure exists in the image, the server may reply prompt information to the terminal to prompt the terminal that the collected image does not satisfy certain requirements.

In some embodiments, the server may directly obtain the facial feature information sent by the terminal. The obtained facial feature information may be the facial feature information recognized by the terminal in accordance with the collected facial image.

In some embodiments, the server may obtain an identity card number sent by the terminal. The obtained identity card number may be an identity card number input by the user and obtained by the terminal. In some embodiments, the obtained identity card number may be an identity card number recognized by the terminal from the collected identity card image.

S202: Obtain prestored facial feature information corresponding to the identity card number.

In some embodiments, when a user applies for an identity card, an identity card management system may collect a facial image of the user, and store the correspondence between the facial image and the identity card number. In some embodiments, the identity card management system may store the correspondence between the facial feature information in the facial image and the identity card number. The identity card management system may be a third party system, such as an identity card management system of a public security agency. The facial feature information stored in the identity card management system may include facial feature information, such as the sizes, locations, and distances the profiles of the five sense organs.

In some embodiments, after obtaining the identity card number of the user by step S201, the server may obtain the prestored facial feature information by looking up facial feature information corresponding to the identity card number in the identity card management system. In some embodiments, the server may look up a facial image corresponding to the identity card number in the identity card management system, and may recognize the facial feature information in the found facial image as the prestored facial feature information.

S203: Determine whether the facial feature information for authentication matches the prestored facial feature information, and if yes, perform step S204, otherwise perform step S205.

In some embodiments, after obtaining the facial feature information of the user for authentication and the prestored facial feature information, the server may compare sub-feature information, including the sizes, locations, and distances of the profiles of the five sense organs, in the facial feature information for authentication with the prestored sub-feature information, including the sizes, locations, and distances of the corresponding profiles of the five sense organs, in the prestored facial feature information to determine the similarity degree between the facial feature information for authentication and the prestored facial feature information.

If the similarity degree is greater than a preset threshold, the server may determine that the facial feature information for authentication matches the prestored facial feature information, and may perform step S204. Otherwise, the server may determine that the facial feature information for authentication does not match the prestored facial feature information, and may perform step S205.

S204: Determine that the identity authentication is successful.

S205: Determine that the identity authentication is not successful.

In step S201, when obtaining the identity card number, the server may also obtain an identity card image collected by the terminal, and may recognize the identity card number thereof.

In some embodiments, the server may obtain the image collected by the terminal, and may recognize the identity card number in the image. To improve the identity authentication efficiency, the server may obtain an image collected by the terminal which contains a face and an identity card at the same time. That is, the image collected by the terminal may contain facial feature information for authentication and an identity card number. After obtaining the image collected by the terminal, the server may recognize the facial feature information for authentication and the identity card number in the image.

In some embodiments, the server may require recognizing the facial feature information and the identity card number from the whole image. To reduce the calculation workload, after obtaining the image containing the facial feature information for authentication, i.e. biometric information for authentication, and the identity card number, i.e. the identity information, the server may recognize the facial feature information for authentication in a first preset region of the image, and may recognize the identity card number in a second preset region of the image.

For example, when taking the image containing both a face and an identity card, the terminal may display the first preset region and the second preset region on an image collection interface. The terminal may also prompt the user that a facial image is collected in the first preset region and an identity card image is collected in the second preset region. After obtaining the image collected by the terminal, the server may recognize the facial feature information only from the first preset region, and may recognize the identity card number only from the second preset region, rather than recognizing the facial feature information and the identity card number in the whole image. Accordingly, it may effectively reduce the calculation workload of the server.

In a potential, realistic application scenario, an illegitimate user may use a facial image or facial model of a legitimate user as a facial image of the illegitimate user. As a result, the facial image collected by the terminal may not be a real-time facial image of the current user. It may reduce the reliability of identity authentication.

In some embodiments, before determining whether the facial feature information for authentication matches the prestored facial feature information, the server may obtain at least two facial images collected by the terminal, and may determine whether specified feature information exists in the facial images to determine whether the facial images are real-time facial images of the current user.

In some embodiments, the server obtaining the image collected by the terminal in step S201 may include obtaining a first image and a second image collected by the terminal. The server recognizing the biometric information for authentication in the image may include recognizing first facial feature information for authentication in the first image, and recognizing second facial feature information for authentication in the second image. The server may also determine whether the first facial feature information for authentication includes first specified feature information, and determine whether the second facial feature information for authentication includes second specified feature information. If the first facial feature information for authentication includes the first specified feature information, and the second facial feature information for authentication includes the second specified feature information, the server may determine that the image collected by the terminal is a real-time facial image of the current user. The server may further determine whether the facial feature information for authentication matches the prestored facial feature information by step S203. Otherwise the server may determine that the image may be a facial image provided by an illegitimate user, and may end the subsequent procedure accordingly. In some embodiments, after the server determines that the image may be a facial image provided by an illegitimate user, the server may also reply prompt information to the terminal to prompt the terminal that the currently collected image does not satisfy certain requirements.

In some embodiments, the first specified feature information and the second specified feature information may include, but not limited to, expressive feature information. The first specified feature information and the second specified feature information may be different.

For example, when collecting the first image, the terminal may prompt the user to collect an image with a specified expression, such as a smiling facial image. When collecting the second image, the terminal may prompt the user to collect an image with another specified expression, such as a crying facial image. The terminal may obtain two facial images with different expressions. Accordingly, the terminal may collect two facial images with different expressions successfully only when the user poses a smiling facial expression and a crying facial expression respectively. An illegitimate user may use a facial image of a legitimate user, e.g., a photograph of the legitimate user, as a real-time facial image. Since the expression of the legitimate user in the facial image is fixed, and the expression of the legitimate user in the facial image may not be consistent with the expression specified by the terminal, the facial image provided by the illegitimate user may not satisfy the image requirements of the terminal. Therefore, the identity authentication may not be successful. Accordingly, the server may be able to determine that the user who provided the facial image is an illegitimate user. It may effectively improve the reliability of identity authentication.

In some embodiments, before determining whether the biometric information for authentication matches the prestored biometric information, the server may obtain at least two facial images collected by the terminal, and may determine whether two preset regions in each image includes a facial image and an identity card image respectively. Accordingly, the server may determine whether the facial image is a real-time facial image of the current user. The relative positions of the two preset regions in at least two images are different.

In some embodiments, the server obtaining the image collected by the terminal in step S201 may include obtaining a first image and a second image collected by the terminal. Recognizing the biometric information for authentication in the first preset region of the image may include recognizing biometric information for authentication in a first preset region of the first image and a first preset region of the second image respectively. Recognizing the identity information in the second preset region of the image may include recognizing identity information in a second preset region of the first image and a second preset region of the second image respectively. A relative position of the first preset region and the second preset region in the first image may be different from that in the second image.

For example, when collecting the first image, the terminal may display a first image collection interface to the user, and prompt the user that a facial image is collected at the upper left corner, i.e. the first preset region, and an identity card image is collected at the lower right corner, i.e. the second preset region. The user may let his/her face and identity card appear at the relative locations of the upper left corner and lower right corner. Therefore, the terminal may successfully collect a facial image at the upper left corner of the first image collection interface and may successfully collect an identity card image at the lower right corner. When collecting the second image, the terminal displays a second image collection interface to the user and prompts the user that a facial image is collected at the upper right corner, i.e. the first preset region, and an identity card image is collected at the lower left corner, i.e. the second preset region. The user may let his/her face and identity card appear at the relative locations of the upper right corner and lower left corner. Therefore, the terminal may successfully collect a facial image at the upper right corner of the second image collection interface and may successfully collect an identity card image at the lower left corner.

In this way, when collecting different images, e.g., the first image and the second image, the terminal may require the user to place his/her face and identity card at different relative positions to ensure that the first image and the second image satisfying certain requirements can be collected successfully. An illegitimate user may use a facial image and an identity card image of a legitimate user as a real-time facial image and identity card image. Since the relative positions of the facial image and identity card image of the legitimate user are fixed, the relative positions of the facial image and identity card image provided by the illegitimate user may not satisfy the relative positions of the first preset region and the second preset region displayed on the current image collection interface. Therefore, the illegitimate user may not be able to satisfy the image requirements of the terminal. Such identity authentication may not be successful. It may avoid that an illegitimate user takes a facial image or facial model of a legitimate user as a real-time facial image of the current user for identity authentication. Such a method may effectively improve the reliability of identity authentication.

In some embodiments, the identity information recognized in the second preset regions of the first image and the second image may be different. For example, identity information of the front side of the identity card may be recognized in the second preset region of the first image and identity information of the reverse side of the identity card may be recognized in the second preset region of the second image. When collecting different images, e.g., the first image and the second image, the terminal may not only require the user to place his/her face and identity card at different relative positions, but also require the user to place the front side and reverse side of the identity card respectively. It may further avoid that an illegitimate user takes a facial image or facial model of a legitimate user as a real-time facial image of the current user. It may further improve the reliability of identity authentication accordingly.

In some embodiments, the method shown in FIG. 1 may prohibit the terminal from reading a local image thereof to avoid that a user uses a local image of the terminal as a real-time facial image of the current user. It may further improve the reliability of identity authentication.

Figure 3:
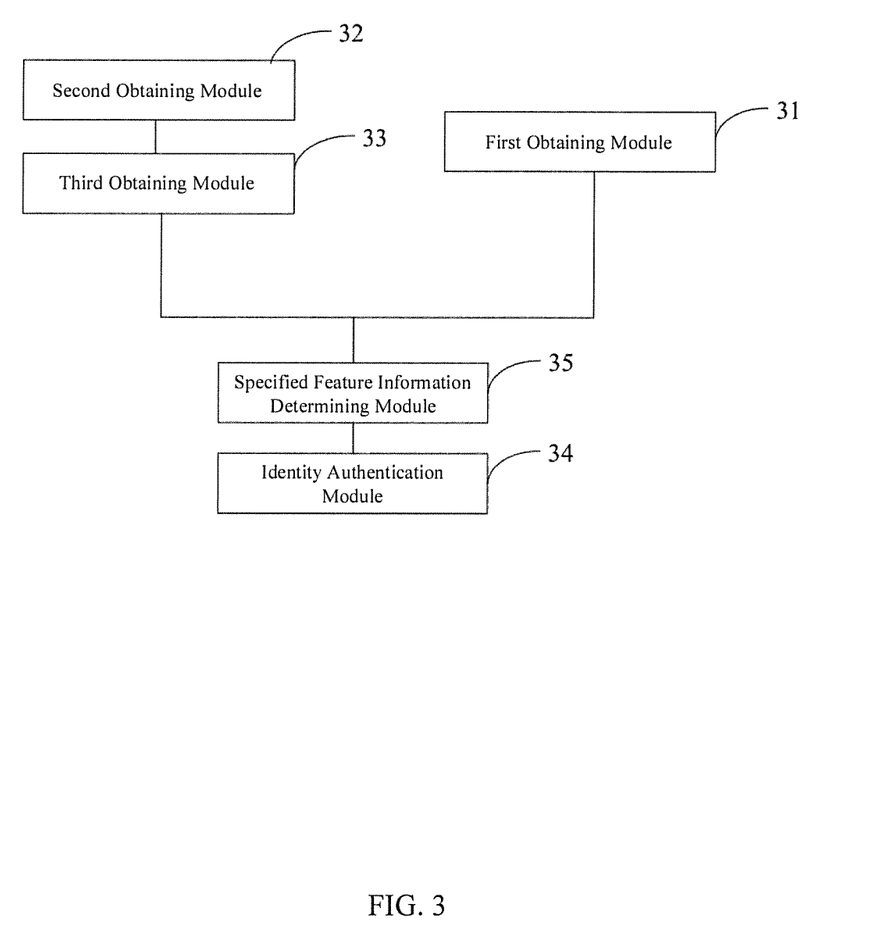
FIG. 3 is a schematic structural diagram of an exemplary apparatus for identity authentication, according to an embodiment of the present application.

Methods for identity authentication in the present application are presented through the above embodiments. In accordance with these methods, the present application also proposes an apparatus for identity authentication as shown in FIG. 3. The apparatus may include the following modules.

A first obtaining module 31 configured to obtain biometric information for authentication collected by a terminal.

A second obtaining module 32 configured to obtain identity information sent by the terminal.

A third obtaining module 33 configured to obtain prestored biometric information corresponding to the identity information.

An identity authentication module 34 configured to determine whether the biometric information for authentication matches the prestored biometric information, and if yes, determine that identity authentication is successful, otherwise determine that the identity authentication is not successful In some embodiments, the biometric information for authentication may include facial feature information for authentication, and the prestored biometric information may include the prestored facial feature information.

In some embodiments, first obtaining module 31 may be configured to obtain an image collected by the terminal and recognize biometric information for authentication in the image.

In some embodiments, first obtaining module 31 may be configured to obtain a first image and a second image collected by the terminal, and recognize first facial feature information for authentication in the first image and recognize second facial feature information for authentication in the second image.

In some embodiments, the apparatus may further include the following module.

A specified feature information determining module 35 configured to determine whether the first facial feature information for authentication includes first specified feature information, and determine whether the second facial feature information for authentication includes second specified feature information before identity authentication module 34 determines whether the biometric information for authentication matches the prestored biometric information. The first specified feature information and the second specified feature information may include expressive feature information. The first specified feature information and the second specified feature information may be different.

In some embodiments, the image may contain identity information, and second obtaining module 32 may be configured to recognize the identity information in the image collected by the terminal.

In some embodiments, first obtaining module 31 may be configured to recognize the biometric information for authentication in a first preset region of the image, and recognize the identity information in a second preset region of the image.

In some embodiments, first obtaining module 31 may be configured to obtain a first image and a second image collected by the terminal. First obtaining module 31 may also be configured to recognize the biometric information for authentication in a first preset region of the first image and that of the second image respectively. First obtaining module 31 may further be configured to recognize the identity information in a second preset region of the first image and that of the second image respectively.

The relative position of the first preset region and the second preset region in the first image may be different from that in the second image.

The present application proposes the methods and apparatuses for identity authentication. The server may obtain biometric information for authentication of the current user sent by the terminal, and may obtain prestored biometric information corresponding to the identity information provided by the current user. Since both the biometric information and identity information of the user may be used to verify the legitimate identity of the user, and the biometric information uniquely corresponds to the identity information, the server may determine whether the user who provides the identity information currently is the legitimate holder himself/herself of the identity information by determining whether the biometric information for authentication matches the prestored biometric information. It may effectively improve the reliability of user identity authentication.

For a person skilled in the art, the present application may be carried out as methods, systems, or computer program products. In other words, the present application may be implemented in full hardware, full software, or by combining software and hardware. Moreover, the present application may be implemented as computer program products that include one or more computer-readable storage media, including, but not limited to, magnetic disk memories, CD-ROM, and optical memories, containing computer executable programs.

The present application is described with reference to the flow charts and/or block diagrams of the methods, apparatuses, and computer program products of the embodiments of the present application. It should be understood that each flow and/or block in the flowcharts and/or block diagrams and any combination thereof in the flowcharts and/or block diagrams may be implemented by computer program instructions. These computer program instructions may be provided to a processor of a computer, an embedded processor or other programmable data processing devices to be an apparatus that executes the instructions by the processor for implementing the functions specified in one or more flows of the flowcharts and/or one or more blocks of the block diagrams.

These computer program instructions may also be stored in a computer-readable memory which may guide a computer or other programmable data processing devices to operate in a specific manner. The instructions stored in the computer-readable memory may make the apparatus storing the instructions become an instruction apparatus which can implement the functions specified in one or more flows of the flowcharts and/or one or more blocks of the block diagrams.

These computer program instructions may also be loaded on a computer or other programmable data processing devices, so that a series of operation steps are executed by the computer or other programmable devices to carry out computer-implemented processing. Accordingly, the instructions executed by the computer or other programmable devices may provide steps for implementing the functions specified in one or more flows of the flowcharts and/or one or more blocks of the block diagrams.

In a typical configuration, a computing device may include one or more processors (CPUs), an input/output interface, a network interface and a memory.

The memory may include a volatile memory, a random access memory (RAM) and/or a non-volatile memory, such as a read-only memory (ROM) or flash memory (flash RAM) in computer-readable media. The memory may be an example of the computer-readable media.

The computer-readable media may include volatile and non-volatile, removable and non-removable media, and may carry out information storage with any methods or technologies. The information may be a computer-readable instruction, data structure, program module or other data. The examples of computer storage media may include but not limited to a phase change memory (PRAM), static random access memory (SRAM), dynamic random access memory (DRAM), other types of random access memories (RAMs), read-only memory (ROM), electrically erasable programmable read-only memory (EEPROM), flash memory or other memory technologies, compact disk read-only memory (CD-ROM), digital versatile disc (DVD) or other optical storage, magnetic cassette tape, magnetic tape and magnetic disk storage or other magnetic storage devices or any other non-transmission media, which may be used to store information that can be accessed by a computing device. According to the definition herein, the computer-readable media do not include transitory media, such as modulated data signals and carriers.

The terms "including," "comprising," or any other variations thereof are intended to cover non-exclusive inclusion. Processes, methods, products or devices including a series of elements may not only include those elements but also include other elements which are not listed expressly or include all inherent elements of such processes, methods, products or devices. If there are no more limitations, elements defined by "comprising a . . . " may not exclude the situation where other identical elements exist in processes, methods, products or devices including the elements.

A person skilled in the art should know that the embodiments of the present application may be provided as methods, systems or computer program products. The present application may be implemented in full hardware, full software, or by combining software and hardware. Moreover, the present application may be implemented as computer program products including one or more computer readable storage media, e.g., magnetic disk memories, CD-ROM, and optical memories, containing computer executable program codes.

The above descriptions are merely the embodiments of the present application and are not intended to limit the present application. Those people skilled in the art may make various changes and variations in accordance with the present application. Any modifications, equivalent replacements, improvements, etc. made within the spirit and principles of the present application shall all be within the scope of the claims of the present application.

What is claimed is:

1. A method performed by one or more processors of an apparatus for identity authentication, the method comprising:
   obtaining an image collected by a terminal, wherein the image includes a first image and a second image;
   obtaining, from the image, biometric information for authentication in a first preset region on the image, and identity information in a second preset region on the image, wherein the biometric information for authentication includes facial feature information for authentication;
   recognizing the biometric information for authentication in the image by recognizing first facial feature information for authentication in the first image, and recognizing second facial feature information for authentication in the second image; obtaining prestored biometric information corresponding to the identity information, wherein the prestored biometric information includes prestored facial feature information;
   determining that the first facial feature information for authentication includes first specified feature information;
   determining that the second facial feature information for authentication includes second specified feature information, wherein the first specified feature information and the second specified feature information include expressive feature information and are different;
   determining whether the biometric information for authentication matches the prestored biometric information; and
   responsive to the determination that the biometric information for authentication matches the prestored biometric information, determining that the identity authentication is successful, or
   responsive to the determination that the biometric information for authentication does not match the prestored biometric information, determining that the identity authentication is not successful.

2. The method of claim 1, wherein:
   the image includes the identity information, and
   obtaining the identity information sent by the terminal includes recognizing the identity information in the image collected by the terminal.

3. The method of claim 2, wherein:
   recognizing the biometric information for authentication in the image includes recognizing the biometric information for authentication in a first preset region of the image, and
   recognizing the identity information in the image collected by the terminal includes recognizing the identity information in a second preset region of the image.

4. The method of claim 3, wherein:
   obtaining the image collected by the terminal includes obtaining a third image and a fourth image collected by the terminal,
   recognizing the biometric information for authentication in the first preset region of the image includes recognizing the biometric information for authentication in a first preset region of the third image and a first preset region of the fourth image, and
   recognizing the identity information in the second preset region of the image includes recognizing the identity information in a second preset region of the third image and a second preset region of the fourth image,
   wherein a relative position between the first preset region and the second preset region of the third image are different from a relative position between the first present region and the second present region of the fourth image.

5. The method of claim 1, wherein obtaining the prestored biometric information corresponding to the identity information includes obtaining the prestored biometric information corresponding to the identity information from a third party system.

6. The method of claim 5, wherein the third party system is an identity document management system of a government authority.

7. An apparatus for identity authentication, the apparatus comprising:
   a memory storing a set of instructions; and
   one or more processors configured to execute the set of instructions to cause the apparatus to perform:
      obtaining an image collected by a terminal, wherein the image includes a first image and a second image;
      obtaining, from the image, biometric information for authentication in a first preset region on the image, wherein the biometric information for authentication includes facial feature information for authentication;
      obtaining identity information in a second preset region on the image;
      recognizing the biometric information for authentication in the image by recognizing first facial feature information for authentication in the first image, and recognizing second facial feature for authentication in the second image;
      obtaining prestored biometric information corresponding to the identity information, wherein the prestored biometric information includes prestored facial feature information;
      determining that the second facial feature information for authentication includes first specified feature information;
      determining that the second facial feature information for authentication includes second specified feature information, wherein the first specified feature information and the second specified feature information include expressive feature information and are different;
      determining whether the biometric information for authentication matches the prestored biometric information,
      responsive to the determination that the biometric information for authentication matches the prestored biometric information, determining that the identity authentication is successful, and
      responsive to the determination that the biometric information for authentication does not match the prestored biometric information, determining that the identity authentication is not successful.

8. The apparatus of claim 7, wherein:
   the image includes the identity information, and
   the one or more processors are further configured to execute the set of instructions to cause the apparatus to perform obtaining the identity information sent by the terminal includes recognizing the identity information in the image collected by the terminal.

9. The apparatus of claim 8, wherein the one or more processors are further configured to execute the set of instructions to cause the apparatus to perform:

recognizing the biometric information for authentication in the image includes recognizing the biometric information for authentication in a first preset region of the image, and recognizing the identity information in the image collected by the terminal includes recognizing the identity information in a second preset region of the image.

10. The apparatus of claim 9, wherein the one or more processors are further configured to execute the set of instructions to cause the apparatus to perform:

obtaining the image collected by the terminal includes obtaining a third image and a fourth image collected by the terminal, recognizing the biometric information for authentication in the first preset region of the image includes recognizing the biometric information for authentication in a first preset region of the third image and a first preset region of the fourth image, and recognizing the identity information in the second preset region of the image includes recognizing the identity information in a second preset region of the third image and a second preset region of the fourth image, wherein a relative position between the first preset region and the second preset region of the third image are different from a relative position between the first present region and the second present region of the fourth image.

11. A non-transitory computer readable medium that stores a set of instructions that is executable by at least one processor of an apparatus to cause the apparatus to perform a method for identity authentication, the method comprising:

obtaining an image collected by a terminal, wherein the image includes a first image and a second image;

obtaining, from the image, biometric information for authentication in a first preset region on the image, and identity information in a second preset region on the image, wherein the biometric information for authentication includes facial feature information for authentication;

recognizing the biometric information for authentication in the image by recognizing first facial feature information for authentication in the first image, and recognizing second facial feature information for authentication in the second image;

obtaining prestored biometric information corresponding to the identity information, wherein the prestored biometric information includes prestored facial feature information;

determining that the first facial feature information for authentication includes first specified feature information;

determining that the second facial feature information for authentication includes second specified feature information, wherein the first specified feature information and the second specified feature information include expressive feature information and are different;

determining whether the biometric information for authentication matches the prestored biometric information;

responsive to the determination that the biometric information for authentication matches the prestored biometric information, determining that the identity authentication is successful, and responsive to the determination that the biometric information for authentication does not match the prestored biometric information, determining that the identity authentication is not successful.

* * * * *

UNITED STATES PATENT AND TRADEMARK OFFICE
CERTIFICATE OF CORRECTION

PATENT NO. : 10,572,642 B2  
APPLICATION NO. : 15/581752  
DATED : February 25, 2020  
INVENTOR(S) : Jiang Feng et al.

Page 1 of 1

It is certified that error appears in the above-identified patent and that said Letters Patent is hereby corrected as shown below:

In the Claims

In Claim 4, Column 14, Lines 3-4, "the first present region and the second present region" should read --the first preset region and the second preset region--.

In Claim 10, Column 15, Lines 25-26, "the first present region and the second present region" should read --the first preset region and the second preset region--.

Signed and Sealed this  
Twenty-seventh Day of August, 2024

Katherine Kelly Vidal  
*Director of the United States Patent and Trademark Office*